US009619789B1

(12) United States Patent
Thiele

(10) Patent No.: US 9,619,789 B1
(45) Date of Patent: Apr. 11, 2017

(54) VIRTUAL CHECK

(71) Applicant: United Services Automobile Association (USAA), San Antonio, TX (US)

(72) Inventor: Ross Andrew Thiele, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 14/679,174

(22) Filed: Apr. 6, 2015

Related U.S. Application Data

(63) Continuation of application No. 13/709,361, filed on Dec. 10, 2012, now Pat. No. 9,002,749, which is a continuation of application No. 12/427,808, filed on Apr. 22, 2009, now Pat. No. 8,332,329.

(51) Int. Cl.
G06Q 20/04 (2012.01)
G06Q 20/10 (2012.01)
G06Q 20/32 (2012.01)
G06Q 20/40 (2012.01)

(52) U.S. Cl.
CPC ....... G06Q 20/0425 (2013.01); G06Q 20/108 (2013.01); G06Q 20/3221 (2013.01); G06Q 20/403 (2013.01)

(58) Field of Classification Search
CPC ............. G06Q 20/0425; G06Q 20/108; G06Q 20/3221; G06Q 20/403
See application file for complete search history.

(56) References Cited

U.S. PATENT DOCUMENTS

| 4,308,588 | A | 12/1981 | Siwula |
| 4,536,647 | A | 8/1985 | Atalla et al. |
| 4,623,965 | A | 11/1986 | Wing |
| 5,093,787 | A | 3/1992 | Simmons |
| 5,175,682 | A | 12/1992 | Higashiyama et al. |
| 5,299,295 | A * | 3/1994 | Kim ...................... G06Q 40/02 358/1.12 |
| 5,455,407 | A | 10/1995 | Rosen |
| 5,484,988 | A | 1/1996 | Hills et al. |
| 5,631,984 | A | 5/1997 | Graf et al. |

(Continued)

FOREIGN PATENT DOCUMENTS

| WO | WO-9722060 A1 | 6/1997 |
| WO | WO-03077473 A1 | 9/2003 |

OTHER PUBLICATIONS

Barmouta, Alexander, "Authorisation and Accounting Services for the World Wide Grid," Thesis, School of Computer Science and Software Engineering, University of Western Australia, 154 pages, Jun. 2004.

(Continued)

Primary Examiner — Calvin Cheung
(74) Attorney, Agent, or Firm — Perkins Coie LLP

(57) ABSTRACT

Methods and systems for virtual checking are described. In some embodiments, information for a virtual check created in a mobile device associated with a payor can be received from the mobile device. The information may include an amount of the virtual check. A computer system may determine whether there are sufficient funds to cover the amount of the virtual check and may place the funds in the amount of the virtual check in reserve when the funds are sufficient to cover the amount of the virtual check.

20 Claims, 9 Drawing Sheets

(56) References Cited

U.S. PATENT DOCUMENTS

| | | | |
|---|---|---|---|
| 5,677,955 A | 10/1997 | Doggett et al. | |
| 6,010,067 A | 1/2000 | Elbaum | |
| 6,021,202 A * | 2/2000 | Anderson | G06F 17/24 |
| | | | 705/18 |
| 6,175,921 B1 | 1/2001 | Rosen | |
| 6,311,170 B1 | 10/2001 | Embrey | |
| 6,629,081 B1 | 9/2003 | Cornelius et al. | |
| 6,820,202 B1 | 11/2004 | Wheeler et al. | |
| 6,823,318 B1 | 11/2004 | Creswell et al. | |
| 6,991,158 B2 | 1/2006 | Munte | |
| RE40,220 E | 4/2008 | Nichols et al. | |
| 7,356,502 B1 | 4/2008 | LaBadie et al. | |
| 7,974,921 B1 | 7/2011 | Al Amri | |
| 8,255,278 B1 | 8/2012 | Young et al. | |
| 8,326,761 B1 | 12/2012 | Hecht et al. | |
| 8,699,779 B1 | 4/2014 | Prasad et al. | |
| 2002/0065774 A1 | 5/2002 | Young et al. | |
| 2002/0169713 A1 | 11/2002 | Chang et al. | |
| 2003/0162565 A1 | 8/2003 | Al-Khaja | |
| 2004/0030601 A1 | 2/2004 | Pond et al. | |
| 2004/0117302 A1 | 6/2004 | Weichert et al. | |
| 2004/0236688 A1 | 11/2004 | Bozeman | |
| 2004/0243496 A1 | 12/2004 | Kim et al. | |
| 2005/0097046 A1 | 5/2005 | Singfield | |
| 2005/0187873 A1 | 8/2005 | Labrou et al. | |
| 2006/0041538 A1 | 2/2006 | King et al. | |
| 2006/0200754 A1 | 9/2006 | Kablesh et al. | |
| 2006/0294096 A1 | 12/2006 | Kraus et al. | |
| 2007/0125840 A1 | 6/2007 | Law et al. | |
| 2007/0156579 A1 | 7/2007 | Manesh | |
| 2007/0174156 A1 | 7/2007 | Emde et al. | |
| 2008/0010215 A1 | 1/2008 | Rackley III et al. | |
| 2008/0133572 A1 | 6/2008 | Verhey-Henke et al. | |
| 2009/0125429 A1 | 5/2009 | Takayama | |
| 2012/0041877 A1 * | 2/2012 | Rao | G06Q 20/108 |
| | | | 705/43 |
| 2012/0239479 A1 | 9/2012 | Amaro et al. | |
| 2013/0166453 A1 | 6/2013 | Regep, II | |
| 2013/0173476 A1 | 7/2013 | Sayers et al. | |
| 2014/0067661 A1 | 3/2014 | Elischer | |
| 2014/0129440 A1 * | 5/2014 | Smith | G06Q 20/042 |
| | | | 705/43 |
| 2014/0162598 A1 * | 6/2014 | Villa-Real | H04M 1/66 |
| | | | 455/411 |
| 2014/0297517 A1 * | 10/2014 | Gnanasekaran | G06Q 20/0425 |
| | | | 705/39 |

OTHER PUBLICATIONS

Bruene, Jim, "Mobile Is the New Online: IBC Bank Puts Mobile Banking on Homepage," NetBanker, 2 pages, Oct. 2, 2008.

Bruene, Jim, "PNC Bank Launches iPhone Mobile Banking in Apple App Store," NetBanker, 3 pages, Feb. 12, 2009.

Bruene, Jim, "Virtual Checking Accounts: On the Web, Plastic Matters," NetBanker, 2 pages, Jun. 1, 1999.

Schoter, Dr. Andreas et al., "Digital Money Online: A Review of Some Existing Technologies," Intertrader Ltd., 60 pages, Feb. 1997.

* cited by examiner

VIRTUAL CHECK

CROSS REFERENCE TO RELATED APPLICATION

This application is a continuation of U.S. patent application Ser. No. 13/709,361, filed on Dec. 10, 2012, now Allowed, which is a continuation of U.S. patent application Ser. No. 12/427,808, filed on Apr. 22, 2009, now U.S. Pat. No. 8,332,329, both of which are hereby incorporated by reference in their entireties for all purposes.

FIELD

This application relates to a method and system for virtual checking.

BACKGROUND

The public has become more comfortable with electronic banking and its use continues to rise. There are features of the paper check system that some of the banking public and banking entities prefer. However, the use of paper checks creates inefficiencies in the marketplace.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an example, a computerized method, and system for performing the method, can include creating, in a payor mobile device, a virtual check image that includes data required for a check presentment and tag data; and sending, from a payor mobile device, a virtual check image and tag data directly to a receiving device. In an example, creating the virtual check image includes generating tag data that includes encryption information. In an example, creating the virtual check image includes generating tag data that includes at least one of check creation time, check creation date, and physical location of check creation. In an example, creating the virtual check image includes embedding at least part of the tag data in the virtual check image. In an example, creating the virtual check image includes automatically populating tag data with data stored in the payor device. In an example, creating the virtual check image includes automatically populating check data fields with data stored in the payor device. In an example, sending the virtual check image includes storing cancelled copy of the check image in the payor mobile device and transmitting a copy of the check image and tag data to the payor's bank.

In an example, a computerized method creates, in a payor mobile device, a virtual check image that includes data required for a check presentment and tag data; and sends, from a payor mobile device, a virtual check image and tag data directly to a receiving device. In an example, the method generates tag data that includes encryption information. In an example, the method generates tag data that includes at least one of check creation time, check creation date, and physical location of check creation. In an example, the method creates embeds at least part of the tag data in the virtual check image. In an example, the method automatically populates tag data with data stored in the payor device. In an example, the method automatically populates check data fields with data stored in the payor device. In an example, the method stores cancelled copy of the check image in the payor mobile device. In an example, the method transmits a copy of the check image and tag data to the payor's bank.

In an example, a computerized method creates, in a payor mobile device, a virtual check image that includes sufficient data required for a check presentment. In an example, the method sends from a payor mobile device, a virtual check image directly to a receiving device. In an example, the method transmits the virtual check image to a receiver. In an example, the method uploads the virtual check image to a bank for deposit. In an example, the method transmits the virtual check image to at least one subsequent receiving device with an endorsement of the prior receiving device. In an example, the method encrypts at least part of the data associated with the virtual check image. In an example, the method applies further security the virtual check image. In an example, the method decrypts the encrypted data associated with the virtual check image in the order of last encrypted, first decrypted. In an example, the method sends a cancelled copy of the virtual check image to a bank on which the check is drawn, and wherein uploading includes reconciling the uploaded check image with the cancelled copy of the check image. In an example, the method checks funds availability.

In further examples, the above methods steps are stored on a machine-readable medium comprising instructions, which when implemented by one or more processors perform the steps. In yet further examples, subsystems or devices can be adapted to perform the recited steps. Other features, examples, and embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Example methods and systems for virtual checking are described. In the following description, for purposes of explanation, numerous specific details are set forth in order to provide a thorough understanding of example embodiments. It will be evident, however, to one skilled in the art that the present invention may be practiced without these specific details.

Figure 1:
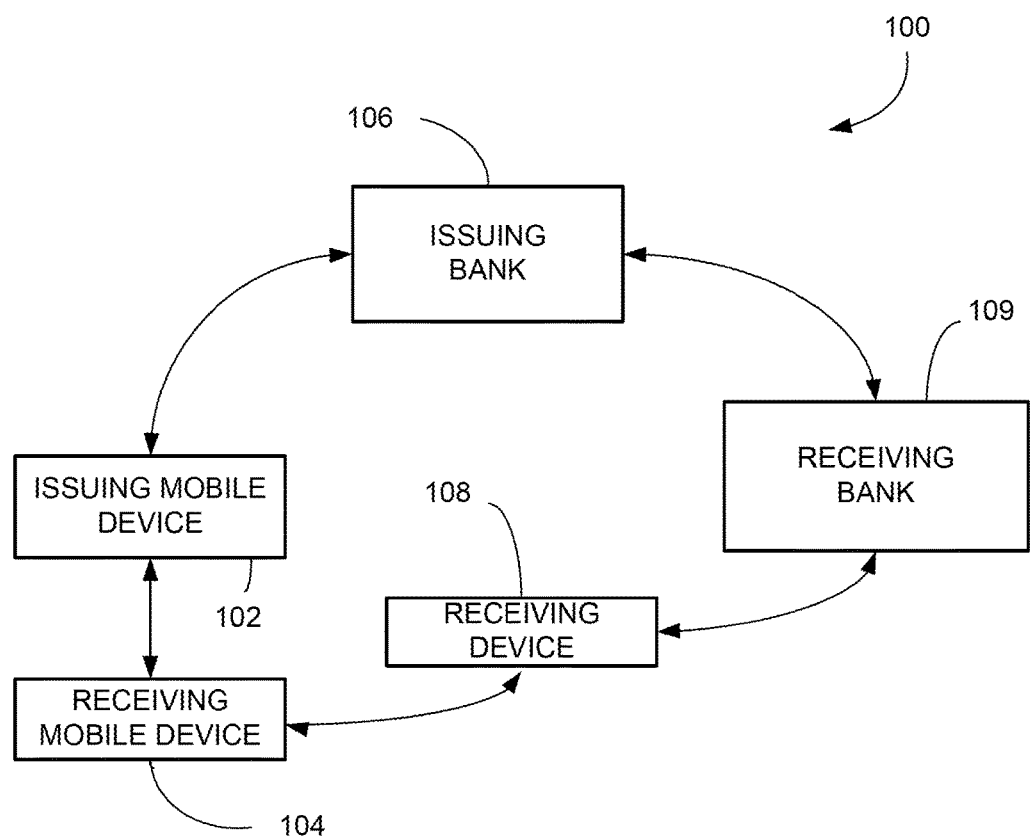
FIGS. 1 and 2 are schematic diagrams of an example virtual checking systems according to an example embodiment.

FIG. 1 illustrates an example virtual checking system 100 in which an issuing device 102 includes an application to create a virtual check. The issuing device 102 can create a new check that can be sent to a receiving device 104 by way of electronic communication. The communication between the devices 102 and 104 can be through a peer-to-peer connection or other direct file sharing connection. The connection can be through wired or other direct, physical connection. Devices 102 and 104 include a transmitter, receiver, or transceiver in combination with an antenna. The devices 102 and 104 can connect wirelessly utilizing a radio frequency or optical link. Various connections standards can be used. Examples include IEEE 802.11 series, Bluetooth, IEEE 802.16 series, among others. Both devices 102 and 104 can provide bandwidth, storage space, and computing power, e.g., by way of electronics including processors and memory, e.g., cache, static memory, and dynamic memory. The application can be stored in non-volatile memory and loaded into cache for use by the processor to perform virtual checking tasks as described herein. The issuing device 102 and/or the receiving device 104 can be a mobile device such as personal computing devices, personal data assistants, netbooks, laptop computers, mobile telephones, etc. In a further example, the device 102 or the device 104 is an at-home banking device.

The issuing device 102 can communicate with the user's issuing bank 106. Bank 106 includes an accounting system with, but is not limited to, a storage system, an application system, and a server. The accounting system can support multiple users. The issuing bank 106 can send to the issuing data regarding the user's account that is associated with the virtual check and can provide other online-banking services. This communication can be over any of the communication systems, methods, and standards described herein or that are in use in the industry. The issuing bank 106 can further provide updates to the virtual check application stored on the issuing device 102. These updates could include security updates or other code updates to add features or correct application defects. The issuing bank 106 can further provide an initial virtual check application installation to the issuing mobile device 102. This installation can be customized with individual security for the device 102 and checks being generated therefrom. The mobile device 102 sends a status report to the issuing bank to confirm successful installation. Tag data can be generated for use with the virtual check application during the installation process.

The receiving device 104 can communicate with a second receiving device 108. The second receiving device 108 can receive the virtual check from the first receiving device 104. Similar communication methods, systems, and protocol between the two receiving devices 104, 108 as used between the devices 102 and 104. In another example, the second receiving device 108 is an Automated Teller Machine (ATM), which can include physical ports to which the first, mobile receiving device 104 can connect. The device 104 can include a removable memory media that can be inserted into a port in the second receiving device 108. Such a memory device, such as a memory card, can include security features such as encryption, passwords, personal identification numbers or sequences, etc. This second receiving device 108 communicates with the receiving bank 109. The receiving bank 109 is the bank that receives the virtual check for deposit from the receiving device 108 and manages the deposit account of the user of the receiving mobile device 104. Bank 109 includes an accounting system with, but is not limited to, a storage system, an application system, and a server. The accounting system can support multiple users.

Figure 2:
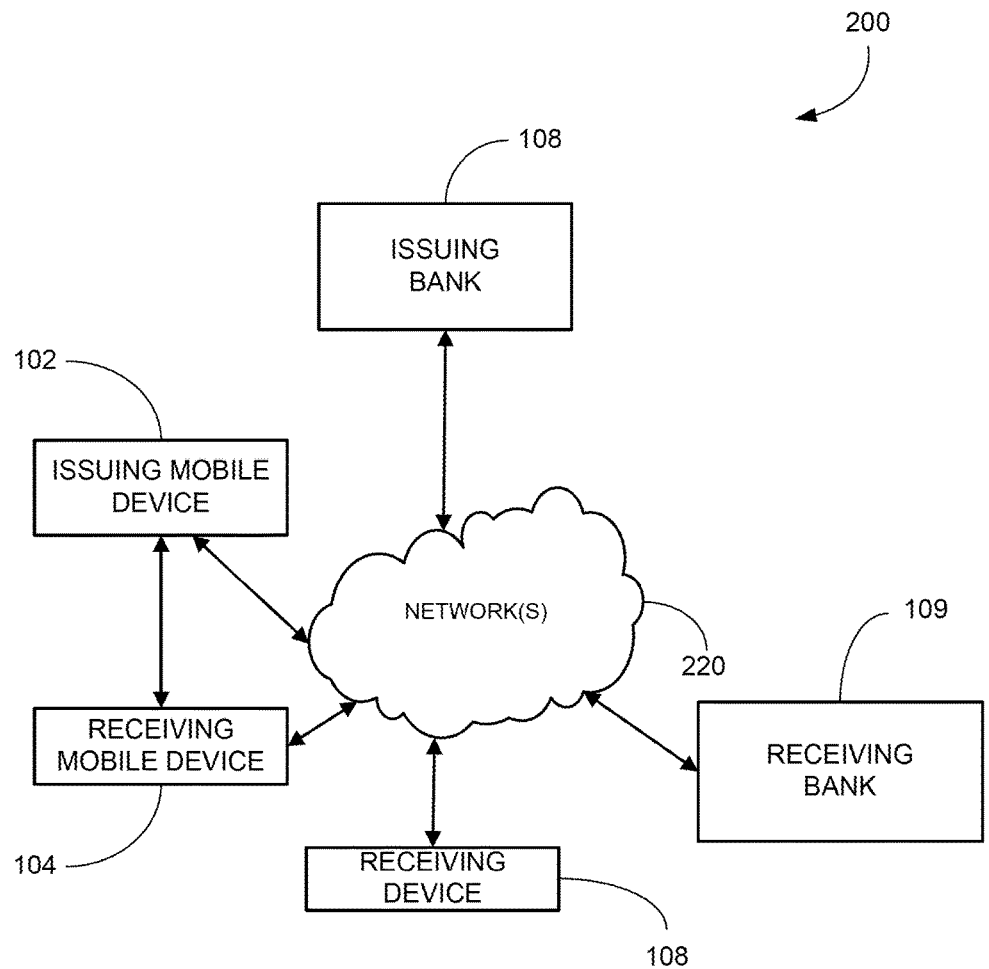

FIG. 2 illustrates an example virtual checking system 200 in which at least one network 220 is used to provide communication channels between the issuing mobile device 102, the receiving mobile device, a receiving device 108, the issuing bank 108, and the receiving bank 109. The network 220 can be a Global System for Mobile Communications (GSM) network, an Internet Protocol (IP) network, a Wireless Application Protocol (WAP) network, a WiFi network, local area network (LAN), or an IEEE 802.11 standards network as well as various combinations thereof. Other conventional and/or later developed wired and wireless networks may also be used.

Figure 3:
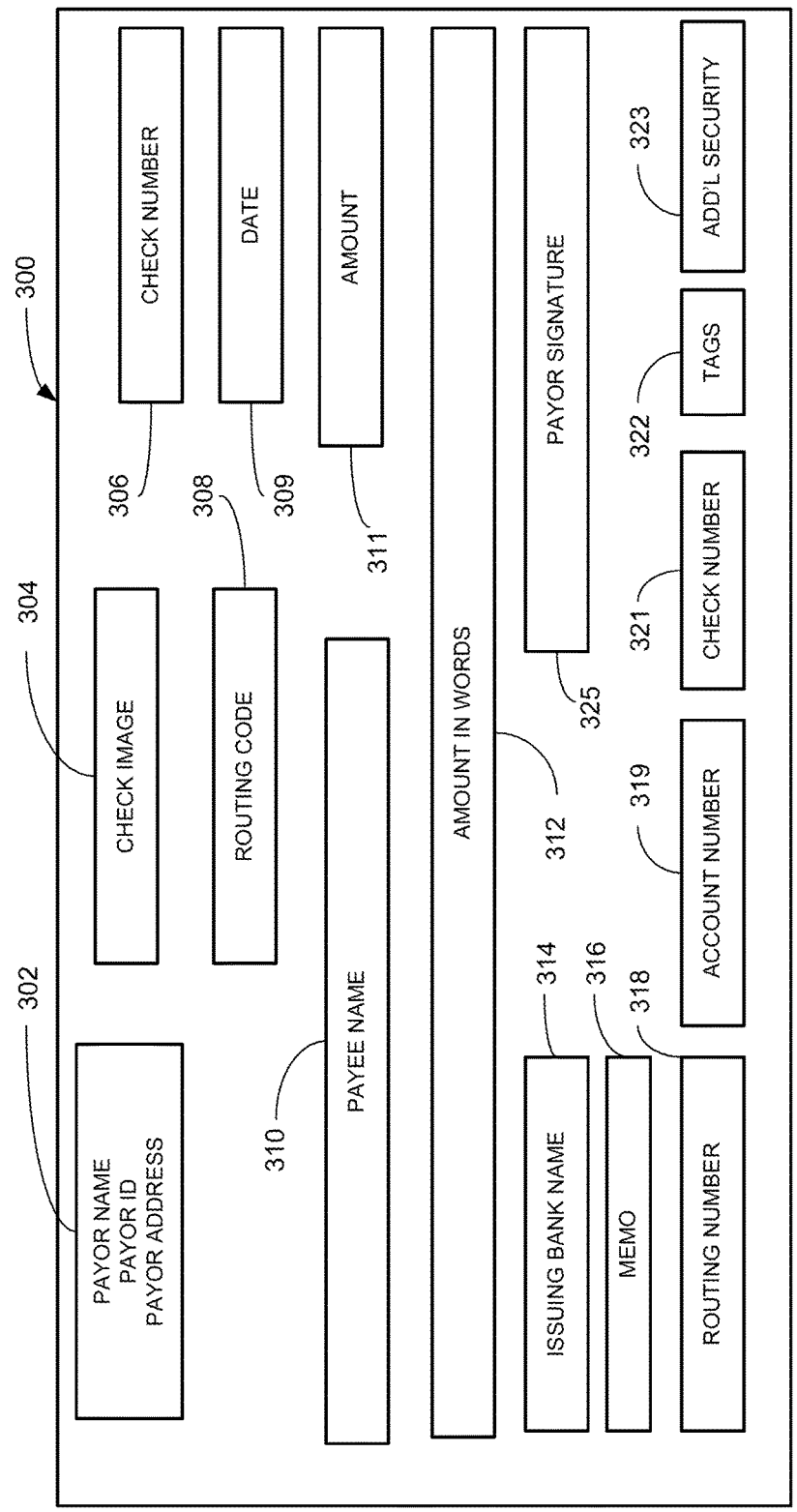
FIGS. 3 and 4 are block diagrams of an example virtual check according to an example embodiment.

FIG. 3 illustrates one side of a virtual check 300, which can be created on the mobile device 102 in an example. The virtual check 300 is displayed as an image on the mobile device 102, either while the virtual check 300 is being created or after the data is entered by the user or application for proofing and sending to the check receiver. In an example, the virtual check 300 appears similar to or identical to a paper check. Virtual check 300 includes a payor's name and/or address in field 302. The check 300 can include an image 304 that the user can select to personalize the check. The check number field 306 includes the sequential identifier for this user's check. The virtual check application can generate this identifier, which is typically a number. In an example, the virtual check application creates the check number by selecting the next number in a sequence and adding a virtual check identifier, for example, a prefix or suffix that identifies the check as a virtual check. In a specific example, the last check was check number 1234. The present check is assigned the number 1235. In the example, where virtual checks have a further identifier this is added to the number, e.g., V-1235 or 1235-V. In an example, the application can access the checking account information at the bank and can add assign the next number in the sequence. The bank can further assign a block of number for use by the virtual checking application based on the paper check ordering history of the user. This block of numbers can not be ordered on physical checks. The issuing bank 106 includes a database that stores any data related to the issuing mobile device and user account information, e.g., balance, transaction history, block of virtual check numbers, encryption keys, etc.

Check routing code field 308 stores and displays on the virtual check a transit routing number that usually appears in the upper right part of a check near a date field. In an example, the transit routing number appears as a fraction, with a numerator and a denominator. The denominator is identical to the first four digits of the routing number. The numerator consists of a prefix that is a one to three digit code indicating the region where the bank is located and a bank number Date field 309 stores and displays on the virtual check the date when the virtual check is being completed by the user, i.e., the payor. The virtual check application in the issuing mobile device can automatically insert the current date into this field 309.

Payee name field 310 stores the name of the recipient of the virtual check 300. This information can be typed in manually by the user/payor or selected from a menu of prior virtual check recipients. In another example, the recipient's device can communicate his/her name to the payee's device, which can automatically fill the payee name field with the name and/or other identification information in filed 310.

Amount field 311 stores the payment amount and displays the amount in number format. In the USA, this amount is displayed in US dollars. This field can also store and display the amount in other currencies.

Amount field 312 stores the payment amount in written or word format. This field 312 can be automatically filled by the application in the mobile issuing device based on the value input into the amount field 311. Accordingly, the virtual check application can have a routine that converts numbers into words to input data into this field word-based amount field 312.

Issuing bank name field 314 stores the name and, if needed, the address of the issuing bank from which this check is drawn. This field 314 can be locked by the issuing bank so that it can not be changed by the payor/user or a recipient of the check.

The memo field 316 provides an optional storage location for the payor/user to insert data that the user wishes to become part of the check record. In an example, this memo is displayed on the check image. In another example, at least part of the memo is not displayed but digitally, electronically, stored with the check image.

The routing number field 318 stores and displays the routing number of the issuing bank. The routing number can be a multiple digit number, e.g., nine digit number, that uniquely identifies the issuing bank. The routing number can be an International Bank Account Number (IBAN), which is an international standard for identifying bank accounts across national borders. The routing number can be a Society for Worldwide Interbank Financial Telecommunication ("SWIFT") number, which is used in a worldwide financial messaging network that exchanges messages between banks and other financial institutions Account number field 319 stores and displays the payor's account number with the issuing bank. The account number can be a series of alphanumeric characters that uniquely identifies the payor's account. A second check number field 321 is positioned right after or appended to the account number field 319. This account number field 319 and the second check number field 319 are used to uniquely identify a particular check. These two fields 319, 321 are positioned at the bottom of the check in a same location such that a display of a particular check, including a printout, could be electronically scanned and the value in these fields recognized to associate the check with a particular transaction.

Tags field 322 provides a field that can store various information about the user, the recipient of the check, the check itself, encryption, etc. This additional data may or may not be displayed on the check.

Additional information field 323 provided a field that can store data regarding any check handler, e.g., payor, recipient, bank, merchant, etc. This field can be set up by the issuing bank or the payor. In an example, this is the only field that can be modified, i.e., written to or deleted by a recipient.

Signature field 325 represents the signature of the payor/user. The signature field can store a digitized signature. This signature can be a signed version sensed on a touch screen of the payor's mobile device. The signature can be a payor specific word, alphanumeric string, or other identifying data. The data in this field 325 can be encrypted or password or personal identification number protected.

Figure 4:
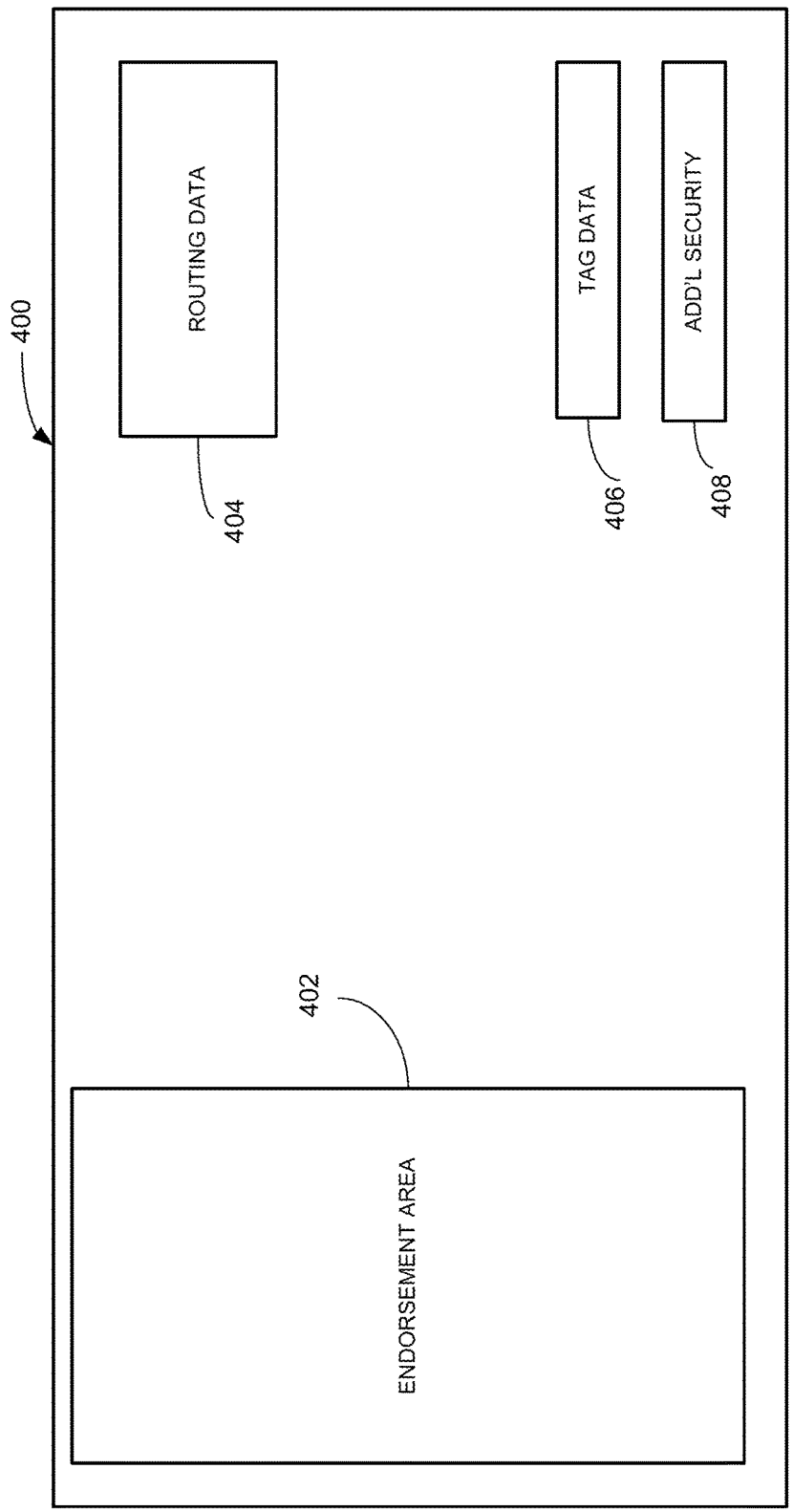

FIG. 4 illustrates another side of virtual check 400, which is sometimes referred to the back of a check. Check 400 includes a endorsement area field 402 in which a recipient of the check are place their mark, e.g., signature, specific word, alphanumeric string, bank account number, or other identifying data. This endorsement acts to identify the recipient of the check to the receiving bank. A routing data field 404 is provided that can store all of the data associated with the routing of the virtual check, e.g., identifying each recipient or receiver of the virtual check. A tag data field 406 stores data associated with the virtual check, for example, the data can include various information about the user, the recipient of the check, the check itself, encryption, banking data, etc. This additional data may or may not be displayed on the check. A security field 408 is provided that can store data regarding the type of security, the version of the security, public key, hash data, the number of times the data has been encrypted, PIN, etc. for added security. This field may or may not be visibly displayed on the check. The added security field may display a token such as a three dimension bar code to uniquely identify the check or the user or the issuing bank such as limits.

Figure 5:
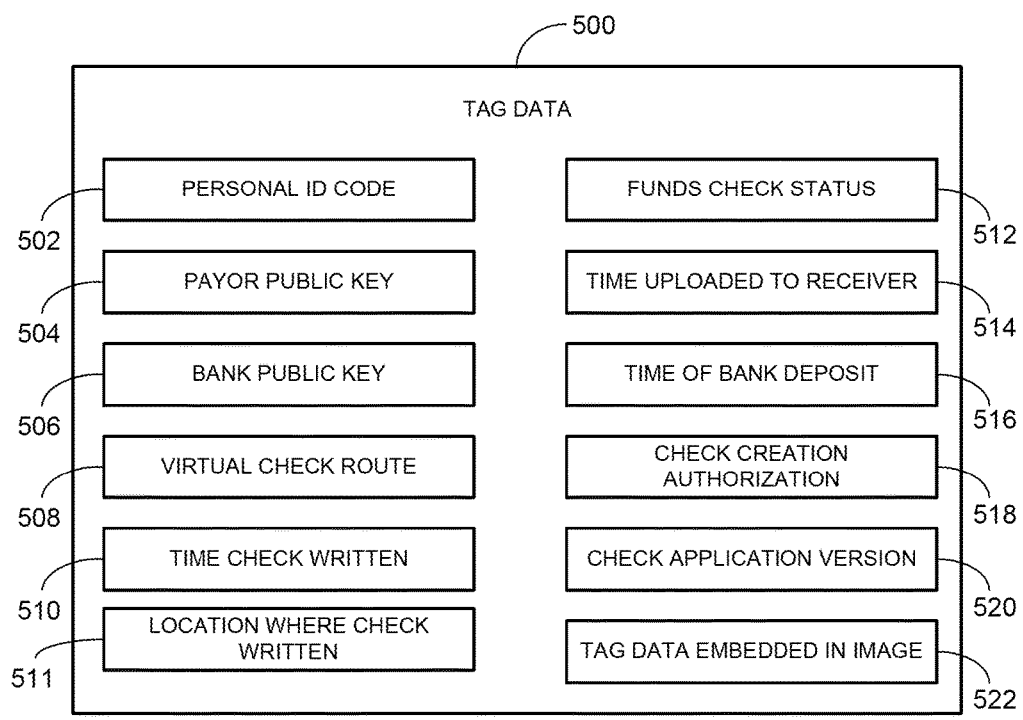
FIG. 5 is a data structures of tag data for a virtual check according to an example embodiments.

FIG. 5 illustrates a data structure 500 that may be deployed in the virtual check to represent tag data. This data structure may be attached to the electronic image of the virtual check. In an example, this data structure is embedded in the image itself. The data structures 500 can store data in field 502 related to the personal identification code of the payer. Field 504 can store the payor's public encryption key. Field 506 can store the bank's public encryption key. Field 508 can store the routing information for the check. In an example, the virtual check route field stored the route traveled by the virtual check from the payor, each recipient, each receiving device, and each bank. Field 510 stores the date and time that the check is written. This time stamp stored in field 510 can be used to expire a stale check after a certain period of time has expired, for example, days, months, or years. In one example, the absent a receipt confirmed signal from the receiving device to the payer device, the check will expire in a matter of minutes after the check was written. In an example, the field 510 stores the time the check was complete and initially sent to the first receiving device.

Field 511 stores the location where the check was created. In an example, the mobile device includes a GPS or other position sensors and stores position data in field 511. This position data provides added security. Additional position data that represents each location where the virtual check is sent from can also be stored in this field. This data can include an identifier of the method to determine location and identification of the device from which the check is sent.

Field 512 stores a value representing a passed or failed finds status check. In an example, the payor's mobile device contacts the associated bank (102 and 106, respectively, in FIGS. 1 & 2) to check the available finds in the payor's account. This can be done daily on a pull basis by the mobile device. In an example, the bank 106 can push the data to the mobile device whenever there is a balance change. In an example, the mobile device 102 checks the available funds once a currency value is entered in the check. Along with this check or preparing the check or transmitting the check, the bank can reserve these funds to make this amount unavailable for use by the payor except for settlement of this particular check.

Field 514 stores time data that represents the time the check was uploaded to a receiver, such as the receiving devices 104 and 108 and receiving bank 109. The time data provides tracking information relating to the check.

Field 516 stores the time of bank deposit data. This data reflects the time the bank of the final check receiver presents the check to the bank for deposit.

Field 518 stores data relating to the payor/user's application authorization to create a virtual check. The data in this field represents authority granted by the payor's financial institution to the payor's mobile device to create a virtual check. This field can store a token that has an amount limit that can provide a maximum amount for the virtual check. In an example, the token can provide a time limit until the application in the mobile device must be recertified by the financial institution. This authorization can be revoked if the payor's account is overdrawn or closed. In the event of a security breach, which can be determined by the financial institution, the authorization can be temporarily suspended until the security can be re-established by the financial institution.

Field 520 stores data relating to the application version stored in the payor's device. This information can include the version of the application, any software updates, copyright notice, contact information, patent notice, etc.

Field 522 can store data relating to any tag data that is stored in the image itself. This field can be a simple indicator that data is stored in the image and may include a secure indicator of the type of storage. In an example, a modulation pattern can be placed in a group of pixels in a substantially invisible manner. For example, the intensity of color or gray scale can be modulated to encode data within an image. In an example, the luminance, chrominance, or luminance and chrominance of pixels can be modulated to represent data within the check image. In another example, data can be stored in the margins or within graphics such as the check image 304 (FIG. 3).

Figure 6A:
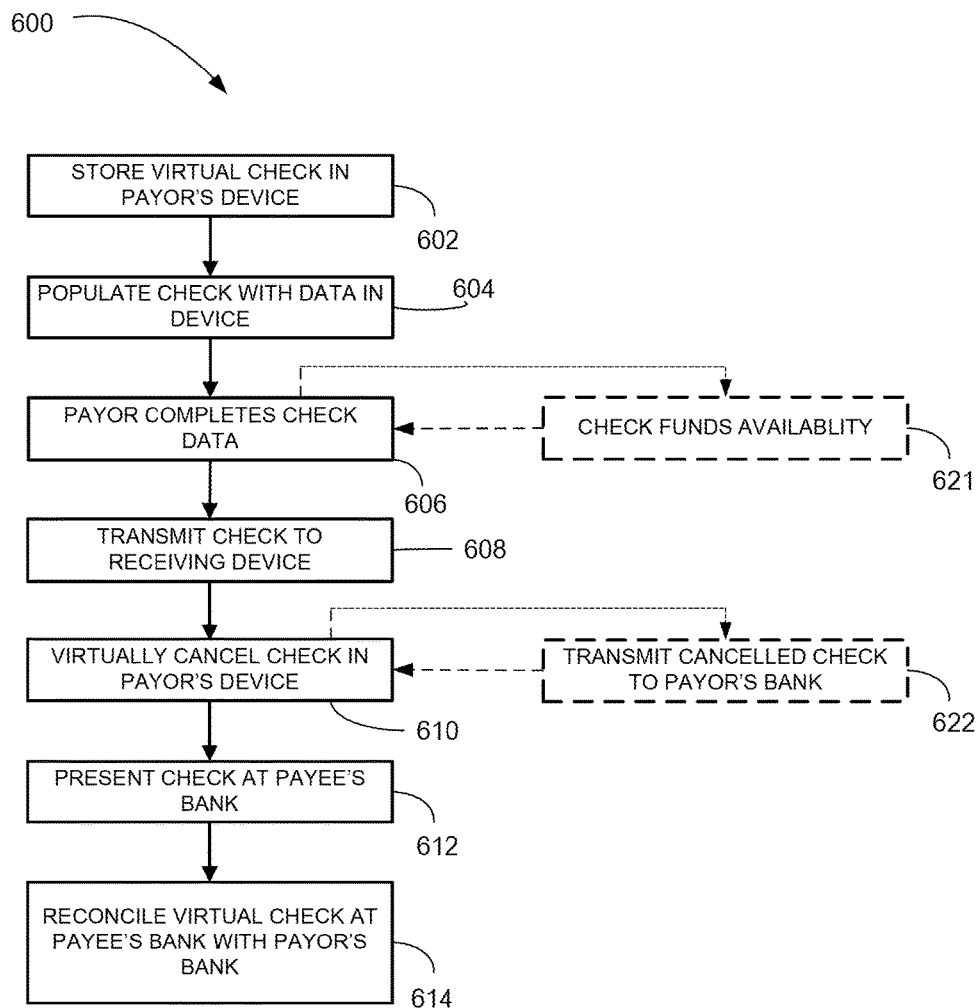
FIG. 6A and FIG. 6B are flowcharts, each illustrating a method for application population in accordance with an example embodiment.

FIG. 6A shows a virtual checking method 600, which can be a computerized application that includes instructions stored in memory in the payor's device. These instructions can be executed using processors in the payor's device.

At 602, a virtual check image is stored in a memory of the payor's device. This virtual check can include at least one of the fields described herein. Some of these fields are displayed as graphics on the virtual check. The stored virtual check can be displayed on the graphical display of the payor's device.

At 604, the fields in the check are populated with data. This population can occur automatically based on data stored in the payor's device. Examples of the automated data include the check number, the routing data, the payor's bank data, a check image, the date, payor name and address, etc. The processor in the payor's device can request this data from its associated memory.

At 606, the payor must complete certain data fields and verify the automatically populated data. Some fields that require the payor to enter data include the payment amount, payee name, and the payor's signature. Other data can be based off the entered data, e.g., the payment amount in words. The application can highlight certain fields that it believes requires further attention of the payor. The payor can also enter optional data.

At 608, the payor transmits the check to the receiver (payee's device). The completed virtual check image is broadcast from the payor's device to the payee's device. This transmission can be a peer-to-peer connection over a public wide-area wireless network such as a PCS, GSM, TDMA, or CDMA wireless network. Other electronic device networks can also be used, such as Bluetooth, an Internet Protocol (IP) network, a Wireless Application Protocol (WAP) network, a WiFi network, local area network (LAN), or an IEEE 802.11 standards network. The communications herein can be encrypted, for example, by public key, symmetric key, random number generator. When the transmission between the sender (payor device) and receiver (payee device) occurs it may be desirable to use one of cyclic redundancy check (CRC), checksum, or parity check to confirm that the entirety of the sent virtual check has actually reached the receiver's device and to confirm that there has not been a loss or corruption of the data. In an example, the receiving device and the sending device include a "handshake" by which the receiving device transmits a confirmation back to the sending device to conform to the sending device that the virtual check data has been successfully received. In an example, the image of the virtual check is transmitted with encrypted data that represents the data that will be honored when the check is presented.

At 610, after the virtual check has been at the receiver's device and confirmed, the payor's device cancels the virtual check in the payor's device. In an example, this includes storing all of the data associated with the check and the data associated with its confirmed receipt by the receiver. In an optional step 622, this data is transmitted to the payor's bank. This transmission need not be at the same time or even immediately after the transmission of the check to the receiving device. The transmission of the check data to the payor's bank can occur as a batch process at the end of the day or each time the mobile device is not currently engaged in another application.

At 612, the payee transmits the virtual check to the payee's bank. This virtual check may have been passed from a first receiving party's mobile device to a further receiving party. This further receiving party would then be the payee and present the virtual check to the bank. The check is presented electronically in a preferred embodiment. In another example, the check is printed and then presented to the payee's bank.

At 614, the payee's bank reconciles the check presented in step 612 with the payor's bank. In an example, the electronic data of the virtual check is compared to the electronic data stored at the payor's bank. In an example, the electronic data being compared includes the amount and payor's account number. If approved the funds that may be held is reserve to honor this check are released to the payee bank to credit to the payees account.

At 621, an optional step is shown that includes checking the funds availability. Checking the funds availability can be done in real time once the payor enters the check amount in the virtual check. The application in the payor's device can communicate with the payor's bank to determine the availability of the funds for the check. The bank could then place these funds in reserve to ensure that funds will be available when the check is presented. In another example, the funds are checked when the virtual check application begins and a maximum check amount is stored in the payor's mobile device. In another example, the application stores a predetermined maximum amount if the check amount is less than the maximum amount the virtual check process proceeds.

Figure 6B:
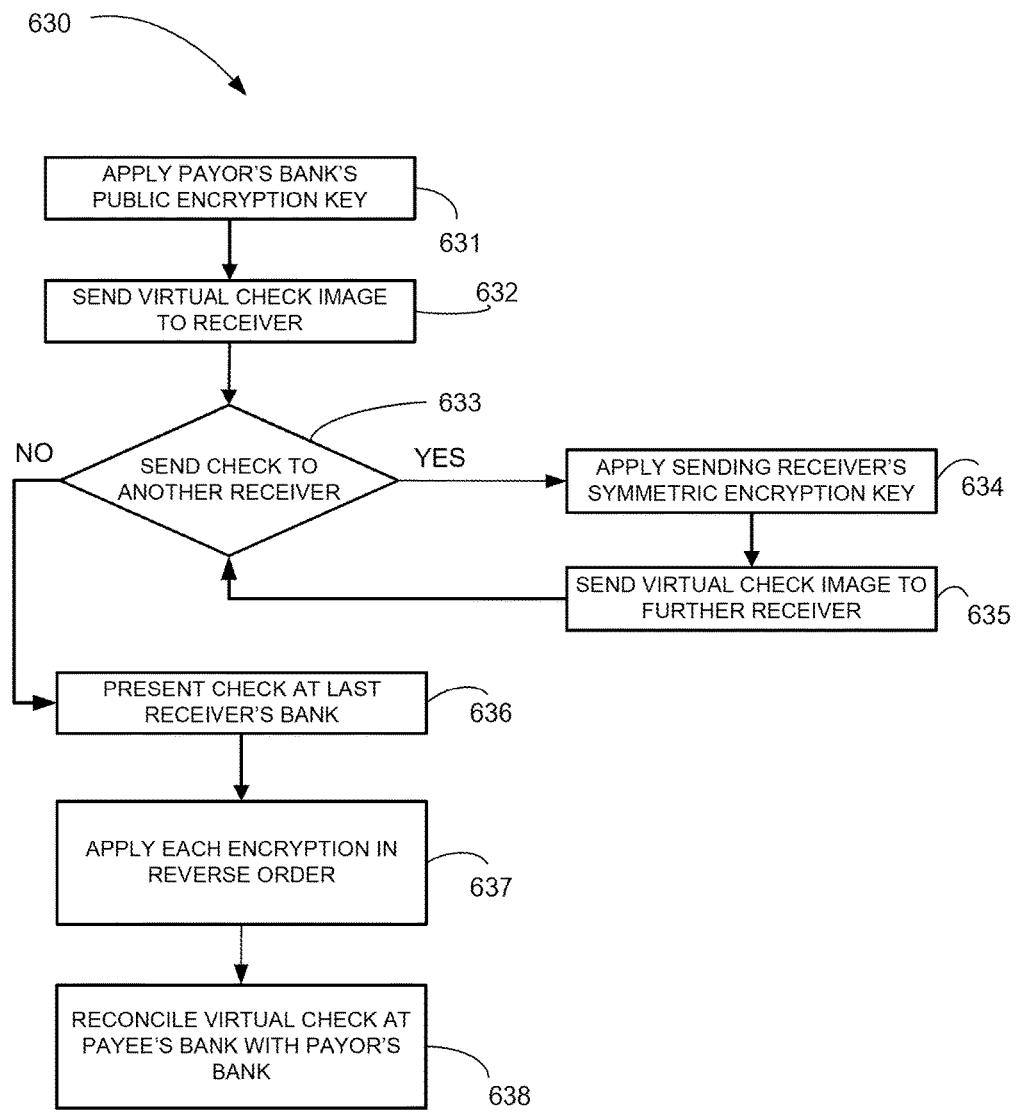

FIG. 6B shows a virtual checking method 630, which can be a computerized application that includes instructions stored in memory in the payor's device. These instructions can be executed using processors in the payor's device. This method describes the use if encryption that can be used with devices, systems, and methods described herein. At 631, the payor's bank's public encryption key is applied to at least one of the check image and check related data. In an example, the encryption can be done by symmetric key. This key can be for an entire bank or for an individual checking account At 632, the virtual check image and any associated data are sent to the receiving device from the payor's device. This can be done as described herein.

At 633, the check can be sent to a further receiving device. If it is being sent, then the process moves to step 634.

At 634, the sending receiving device applies the sender's symmetric public encryption key to one of the virtual check and the associated data. Now the check and/or data are subject to two encryptions. The symmetric encryption key must be available to the banking system and can be sent to the receiver's device and stored in application software on the receiver's device.

At 635, the virtual check and data is sent to the further receiving device. Similar procedures described herein between the payor and first receiver for the transmission of the check can occur between subsequent transmissions of the check between subsequent receivers. Here the application of each receiver endorses the check, e.g., in the endorsement field of the virtual check and appropriate tag data is updated. After step 635, the process returns to step 633. Another transfer to a receiver can occur. If not the process moves to step 636.

At 636, the check is presented to the last receiver's bank. The bank applies the keys in last in first out order. Once the receiver's encryptions are decrypted, the receiver's bank is left with encrypted data. If a private/public key (asymmetric) encryption was used, then the encrypted data is sent to the issuing bank for decryption. The issuing bank decrypts and transfers the funds to the receiving bank. If the check was encrypted with symmetric key, then the receiving bank access the issuing bank's key that is associated with this account and decrypts the check itself.

At 638, the virtual check is reconciled with the payor's bank. This can be done through Automated Clearing House (ACH), Clearing House Interbank Payment System (CHIPS), or Society for Worldwide Interbank Financial Telecommunication (SWIFT). The funds represented by the check are withdrawn from the payor's account and deposited in the last receiver's account.

This process refers to an asymmetric key encryption. It will be recognized that symmetric key encryption, same key encrypts and decrypts, can also be used. These keys are stored securing within the application in the respective devices.

Figure 7:
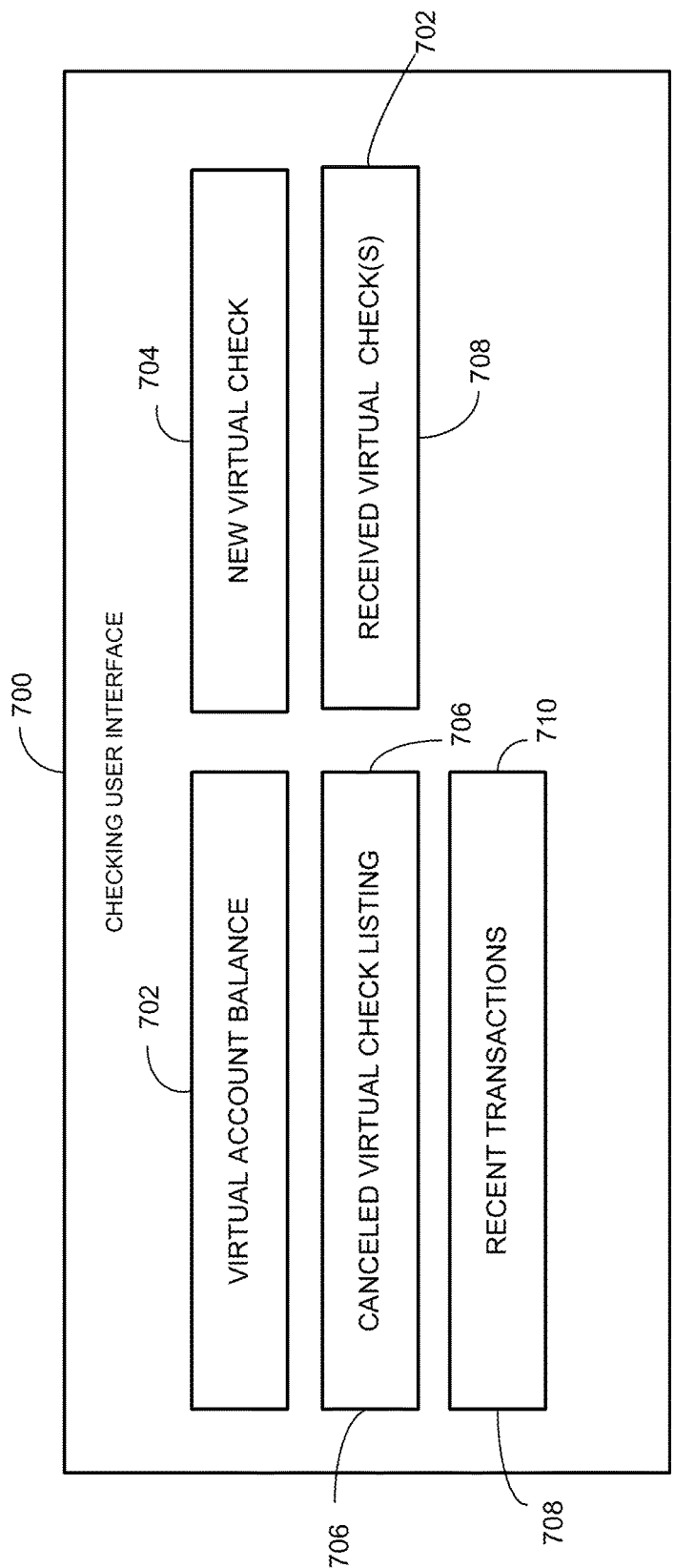
FIG. 7 is a graphical user interface for a mobile virtual check application in accordance with an example embodiment.

FIG. 7 illustrates a graphical user interface (checking user interface) 700 that can be displayed by an application on a device. The checking user interface 700 is an interface between the user, e.g., payor, and the application to create a virtual check. Field 702 displays the virtual account balance. This balance can be equal to the real-time balance of the user's checking account or can represent the maximum amount that can be paid out by virtual check over a given time period. This amount can be less than the actual checking account. In another example, this amount is limited by a line of credit available to the user. Field 704 displays a command that when selected (touch screen, key pad, cursor, voice command, etc.) begins the process of creating a new virtual check. In an example, selecting field 704 pulls up the virtual check image 300 or 400 and populated the tag data 500. Field 706 provides a listing of canceled or sent virtual checks. Filed 708 provides a listing of received virtual checks. This list can include check that have been deposited in the bank and those awaiting deposit. Field 710 can provide a list of recent transactions in the user's bank account. These transactions are not limited to virtual check transactions and can include all types of transactions in the bank account.

Figure 8:
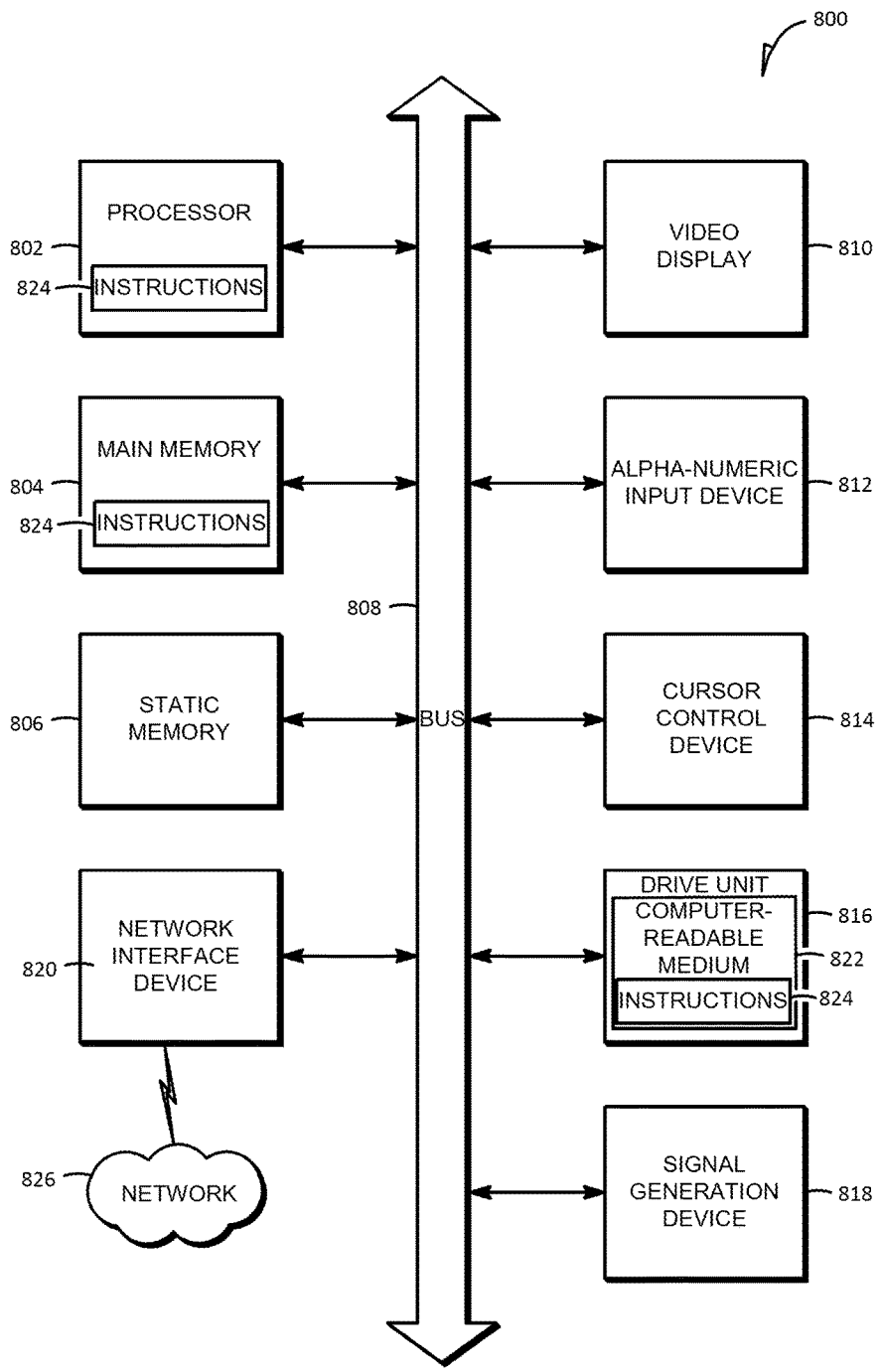
FIG. 8 illustrates a diagrammatic representation of a machine in the example form of a computer system within which a set of instructions for causing the machine to perform any one or more of the methodologies discussed herein may be stored or executed.

FIG. 8 shows a diagrammatic representation of machine in the example form of a computer system 800 within which a set of instructions may be executed causing the machine to perform any one or more of the methods, processes, operations, applications, or methodologies discussed herein. The provider 102 may be deployed on the computer system 800. The access device 106 may include the functionality of the computer system 800.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a drive unit 816, a signal generation device 818 (e.g., a speaker) and a network interface device 820.

The drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies shown in the various embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

An example of a mobile device for use with the methods and systems described herein is self-powered wireless device capable of a wide-area or local wireless communication with a plurality of other of hand-held, mobile, self-powered wireless devices or with base stations that are at a fixed location. The hand-held, mobile, self-powered wireless device can contain a memory, a human input device, a display, and an imaging device. The memory stores a plurality of data relating to a virtual check including image data, application data, and other data. Hand-held as used in the present disclosure can be devices small enough to be held in a human's hand. Wireless network as used in the present disclosure can be a wireless network capable of transmitting data over thousands of feet, for example, a wireless telephone network or wireless computer network or a peer-to-peer network. Self-powered as used in the present disclosure describes a device that will have self-contained power available wherever the user wants to take the device away from a base or stationary source of power. In one example, self-powered devices can be powered by a rechargeable battery, e.g., a lithium-ion battery. In an example, a fuel cell can be the mobile, self-power source. In another example, a mobile device is not a fixed-location equipment such as desktop personal computer.

A mobile device as described herein can be a wireless telephone, such as PCS, GSM, TDMA, or CDMA telephone, that employs a subscriber identity module (SIM) having with several kilobytes of non-volatile memory. Wireless telephones can store special software applications to affect the user interface elements described herein. The software application is stored in the memory of the telephone and can be loaded into volatile memory for execution by a processor or other hardware. The telephone can further store configuration information and user data such as stored images and related data.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The present description is a system of virtual checks created on a mobile device (such as a phone) and then transmitted to a recipient's mobile device, which can then communicate, either over the Internet or through a traditional ATM, to the recipient's bank for settlement. In practice, the check is filled out on the mobile device's screen (just like a traditional check, and it has a serialized number which can be immediately communicated to the bank, in one example) and then sent through any suitable communications protocol to the recipient. The recipient then accesses an ATM and pairs their phone with the ATM and 'deposits' the check. The virtual check would provide enough information to create a substitute check for settlement processes. Additionally, the recipient could just have a 'deposit' application on their phone which can transmit the virtual check to their bank.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

Thus, methods and systems for population of an application have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed:
1. A method comprising:
receiving, from a mobile device comprising a position sensor and associated with a payor, information for a virtual check created in real-time in the mobile device associated with the payor, the information including an amount of the virtual check and a location indicating where the virtual check was created or sent from;
associating the amount of the virtual check and the location with information associated with the payor stored at a computing system;
determining, by the computing system, whether there are sufficient funds to cover the amount of the virtual check; and
placing, by the computing system, funds in the amount of the virtual check in reserve when the funds are sufficient to cover the amount of the virtual check.
2. The method of claim 1, wherein determining, by the computing system, whether there are sufficient funds to cover the amount of the virtual check comprises determining whether there are sufficient funds in an account associated with the payor.
3. The method of claim 1, wherein placing, by the computing system, the funds in the amount of the virtual check in reserve when the funds are sufficient to cover the amount of the virtual check comprises placing the funds in reserve until the virtual check is presented.
4. The method of claim 1, wherein the mobile device generates tag data associated with the virtual check.
5. The method of claim 4, wherein the mobile device embeds at least a portion of the tag data in the virtual check.

6. The method of claim 4, wherein the tag data includes at least one of: a physical location of a creation of the virtual check, a date the virtual check was created, a time the virtual check was created, or security information, wherein the security information includes a type of security, a version of security, and a number of times the tag data associated with the virtual check has been encrypted.

7. The method of claim 1, wherein the amount of the virtual check is received when the amount of the virtual check is entered into the virtual check.

8. The method of claim 1, further comprising:
receiving an indication that an application that creates the virtual check has been initiated on the mobile device;
checking, by the computing system, a maximum virtual check amount; and
sending the maximum virtual check amount to the mobile device.

9. A non-transitory, computer-readable medium having computer-readable instructions that, when executed by one or more computer processors, direct the one or more computer processors to:
receive, from a mobile device comprising a position sensor and associated with a payor, information for a virtual check created in real-time in the mobile device associated with the payor, the information including an amount of the virtual check and a location indicating where the virtual check was created or sent from;
associate the amount of the virtual check and the location with information associated with the payor stored at a computing system;
determine whether there are sufficient funds to cover the amount of the virtual check; and
place funds in the amount of the virtual check in reserve when the funds are sufficient to cover the amount of the virtual check.

10. The non-transitory, computer-readable medium of claim 9, wherein the computer-readable instructions that, when executed by the one or more computer processors, direct the one or more computer processors to determine whether there are sufficient funds to cover the amount of the virtual check further direct the one or more computer processors to determine whether there are sufficient funds in an account associated with the payor.

11. The non-transitory, computer-readable medium of claim 9, wherein the computer-readable instructions that, when executed by the one or more computer processors, direct the one or more computer processors to place the funds in the amount of the virtual check in reserve when the funds are sufficient to cover the amount of the virtual check further direct the one or more computer processors to place the funds in reserve until the virtual check is presented.

12. The non-transitory, computer-readable medium of claim 9, wherein the mobile device generates tag data associated with the virtual check and embeds at least a portion of the tag data in the virtual check.

13. The non-transitory, computer-readable medium of claim 12, wherein the tag data includes at least one of: a physical location of a creation of the virtual check, a date the virtual check was created, a time the virtual check was created, or security information, wherein the security information includes a type of security, a version of security, and a number of times the tag data associated with the virtual check has been encrypted.

14. The non-transitory, computer-readable medium of claim 9, wherein the amount of the virtual check is received when the amount of the virtual check is entered into the virtual check.

15. The non-transitory, computer-readable medium of claim 9, further comprising:
receiving an indication that an application that creates the virtual check has been initiated on the mobile device;
checking a maximum virtual check amount; and
sending the maximum virtual check amount to the mobile device.

16. A system comprising:
a memory containing machine-readable instructions; and
a computer processor in communication with the memory and configured to execute the machine-readable instructions to:
receive, from a mobile device comprising a position sensor and associated with a payor, information for a virtual check created in real-time in the mobile device associated with the payor, the information including an amount of the virtual check and a location indicating where the virtual check was created or sent from;
associate the amount of the virtual check and the location with information associated with the payor stored at a computing system;
determine whether there are sufficient funds to cover the amount of the virtual check; and
place funds in the amount of the virtual check in reserve when the funds are sufficient to cover the amount of the virtual check.

17. The system of claim 16, wherein the computer processor that is configured to execute the machine-readable instructions to determine whether there are sufficient funds to cover the amount of the virtual check is further configured to execute the machine-readable instructions to determine whether there are sufficient funds in an account associated with the payor.

18. The system of claim 16, wherein the computer processor that is configured to execute the machine-readable instructions to place the funds in the amount of the virtual check in reserve when the funds are sufficient to cover the amount of the virtual check is further configured to execute the machine-readable instructions to place the funds in reserve until the virtual check is presented.

19. The system of claim 16, wherein the mobile device generates tag data associated with the virtual check and embeds at least a portion of the tag data in the virtual check, and wherein the tag data includes at least one of: a physical location of a creation of the virtual check, a date the virtual check was created, a time the virtual check was created, or security information, wherein the security information includes a type of security, a version of security, and a number of times the tag data associated with the virtual check has been encrypted.

20. The system of claim 16, wherein the computer processor that is configured to execute the machine-readable instructions is further configured to execute machine-readable instructions to:
receive an indication that an application that creates the virtual check has been initiated on the mobile device;
check a maximum virtual check amount; and
send the maximum virtual check amount to the mobile device.

* * * * *